United States Patent [19]

Whalen-Shaw

[11] Patent Number: 5,449,402
[45] Date of Patent: Sep. 12, 1995

[54] MODIFIED INORGANIC PIGMENTS, METHODS OF PREPARATION, AND COMPOSITIONS CONTAINING THE SAME

[76] Inventor: Michael Whalen-Shaw, 7041 Zane Trail Rd., Circleville, Ohio 43113

[21] Appl. No.: 198,098

[22] Filed: Feb. 17, 1994

[51] Int. Cl.$^6$ ................................. C09C 1/02
[52] U.S. Cl. ................. 106/416; 106/464; 106/465
[58] Field of Search ............... 106/416, 464, 465

[56] References Cited

U.S. PATENT DOCUMENTS

| | | | |
|---|---|---|---|
| 2,176,877 | 10/1939 | Alessandroni | 106/423 |
| 3,453,131 | 7/1969 | Fadner | 106/416 |
| 3,726,700 | 4/1973 | Wildt | 106/437 |
| 3,856,545 | 12/1974 | Ferrigno | 106/462 |
| 3,864,140 | 2/1975 | Ferrigno | 106/462 |
| 3,949,138 | 4/1976 | Heiser | 428/323 |
| 4,117,191 | 9/1978 | Kurrle | 428/330 |
| 4,294,885 | 10/1981 | Sunden | 428/404 |
| 4,331,706 | 5/1982 | Kindrick | 427/74 |
| 4,517,098 | 5/1985 | Hann et al. | 210/701 |
| 4,640,716 | 2/1987 | Cleland | 106/161 |
| 4,738,726 | 4/1988 | Pratt et al. | 106/487 |
| 4,767,466 | 8/1988 | Nemeh et al. | 106/487 |
| 4,820,554 | 4/1989 | Jones et al. | 427/391 |
| 4,933,387 | 6/1990 | Wason | 524/450 |
| 4,954,566 | 9/1990 | Gowan, Jr. | 525/329.9 |
| 4,963,625 | 10/1990 | Gowan, Jr. | 525/329.9 |
| 5,039,782 | 8/1991 | Langer et al. | 528/272 |
| 5,169,441 | 12/1992 | Lauzon | 106/416 |

FOREIGN PATENT DOCUMENTS

| | | |
|---|---|---|
| 905091 | 5/1991 | South Africa . |
| 905093 | 5/1991 | South Africa . |

*Primary Examiner*—Mark L. Bell
*Assistant Examiner*—Scott L. Hertzog
*Attorney, Agent, or Firm*—Tarolli, Sundheim & Covell

[57] ABSTRACT

A functionally modified pigment particle is prepared by mixing a flocculated pigment of kaolin clay or calcium carbonate with a modifier having charge sites opposite in sign to the charge sites of the flocculated pigment. Preferably, the flocculated pigment is an aqueous suspension of filter cake particles. The suspension is non-dispersed, or partially dispersed by neutralization with a strong base such as sodium carbonate. The suspension has a pH in the range of 6-9. Preferred modifiers are a water insoluble or dispersible latex binder, a water or alkali soluble organic or inorganic polymeric binder, a non-film forming organic particle such as plastic pigment, an optical brightener, a fluorocarbon, or combination thereof. When mixed with the filter cake, the modifiers become electrostatically bound to the pigment particles.

44 Claims, No Drawings

MODIFIED INORGANIC PIGMENTS, METHODS OF PREPARATION, AND COMPOSITIONS CONTAINING THE SAME

TECHNICAL FIELD

The present invention relates to a composition comprising a kaolin clay or calcium carbonate pigment and functional materials electrostatically bonded to the pigment particles. These compositions are useful in paper coatings, as paper fillers, and in paint, ink, rubber and plastic compositions.

DESCRIPTION OF THE PRIOR ART

Traditional coatings, and in particular paper coatings, are prepared to contain one or more pigments, one or more binders, thickeners, optical brighteners, crosslinking agents, bactericides, lubricants, defoamers and antifoams. The pigments used are dispersed pigments. By "dispersed", it is meant that a dispersing agent such as sodium polyacrylate has been added to provide a dispersion of particles in which both the viscosity and the particle size have been significantly reduced relative to the state before the dispersant was added.

It is common practice to spray dry a pigment dispersion and then to back-add dry pigment to the wet pigment dispersion to increase the solids content. It is also common in the art to describe the mixture of a pigment in water as a pigment slurry and the mixture of a pigment in water with a dispersant as a pigment dispersion. It is not uncommon in pigment processing for an undispersed cake or filter cake to be formed prior to dispersion of a pigment.

An example is the manufacture of kaolin clay. Kaolin clay is traditionally manufactured by a series of steps which may include bleaching, flotation, particle size fractionation, magnet treatment, flocculation with sulfuric acid, alum, or a cationic polymer, filtration to produce a filter cake and reduce the water content, and then dispersion. The kaolin clay is dispersed in the final stages of processing from a filter cake. The cake is usually acidic because of the prior flocculation with sulfuric acid, alum, or a cationic polymer.

The dispersion of the clay filter cake is normally carried out with the combination of sodium carbonate and sodium polyacrylate. The sodium carbonate functions to neutralize the clay filter cake and produce a neutral pH. It also reduces the viscosity of the filter cake. The function of the sodium polyacrylate is to satisfy the cationic demand of the kaolin clay and further disperse the clay particles and reduce viscosity.

As the totally flocculated clay filter cake is neutralized and increasing amounts of dispersant are added, the clay becomes less and less flocculated until a point of minimum viscosity is attained. The clay at this point is identified as fully dispersed. Double layer repulsion with the sodium polyacrylate dispersant provides dispersion and minimum viscosity.

This process produces an approximately 60% solids dispersed filter cake. Spray dried clay can then be back-added to the dispersion to achieve a normal shipping solids content of about 70%. It is known in the art that there exists a very strong affinity between the sodium polyacrylate and the net cationic charges of the clay such that other carboxylated polymers, such as sodium carboxymethyl cellulose, are not easily able to displace the sodium polyacrylate.

It is further recognized that varying states of pigment flocculation, before pigment dispersion, can be reached. This is accomplished by adding various flocculating materials, such as cationic polymers, followed by a judicious amount of dispersing agent to provide colloidal and shear stability. These partially flocculated pigment suspensions fall within the broad definition of flocculated. These partially flocculated pigment suspensions are termed in the art as structured or high bulking pigments.

Increasingly structured or high-bulking pigments are showing value in many applications. Structured or high-bulking pigments are defined as a collection of aggregate particles composed of identical or non-identical subparticles and are generally flocculated by chemical or thermal means. Structured or high-bulking pigments have been shown to offer improvements in optical and printing properties when used as a partial or total substitution for clay in paper coatings.

The first of the high-bulking pigments introduced into paper coatings was calcined clay. By virtue of its internal pore volume and its disruption of tight parallel clay packing, experienced with standard clay in paper coatings, improved porosity and light scatter is obtained. Calcination of clay, however, produces a product which has high abrasion and which is deleterious to the wires used in the paper making process. In addition, the use of calcined clay at high levels in paper coatings may result in either runnability problems or reduced gloss.

U.S. Pat. No. 4,294,885 discloses a process for forming a surface modified pigment of kaolin clay. A primary layer of $Al_2O_3$-$SiO_2$ hydrate gel is precipitated onto previously dispersed clay particles to provide an anionic pigment material. A secondary layer of polymeric binder is then hydrogen or ionically bonded to the primary layer. The process is complex and not readily incorporated into normal clay processing.

U.S. Pat. No. 4,933,387 discloses a process for hydrothermally treating dispersed kaolin clay with an alkali metal silicate to produce a high bulking clay. The clay is anionic in nature following hydrothermal treatment, as evidenced by a high cation exchange capacity.

U.S. Pat. Nos. 4,738,726 and 4,767,466 disclose a process of producing a high bulking partially flocculated clay by deflocculating a suspension of kaolin clay with a dispersing agent, fractionation by sedimentation, addition of a water-soluble cationic polyelectrolyte and sulfuric acid to reflocculate the clay, bleaching, filtration, washing, and finally deflocculation with tetrasodium pyrophosphate or sodium polyacrylate dispersant.

U.S. Pat. No. 4,640,716 discloses a process for producing a high bulking clay in which a dispersed clay is blended with and partially flocculated by a source of zirconium ion. Sulfuric acid is added to complete flocculation. The clay is then filtered, and the filter cake is dispersed in a conventional manner with tetrasodium pyrophosphate to provide a 63% solids slurry.

The above products exhibit low abrasion while providing improvements in optical properties, printability, and as a result of their increased bulk, improved coating coverage over a substrate or lower coating weight. Several of these products, however, exhibit either poor rheology or lack of stability in standard paper coating procedures. A rheology appropriate to blade coating speeds in excess of 4,000 feet per minute is desirable. Additionally, structured pigments must survive the shear conditions encountered in coating preparation and use, such as jet cooking, pigment dispersion, and pumping and blade metering.

The above technologies for preparing structured pigments and their use in paper coatings to reduce the level of expensive opacifying pigments such as titanium dioxide, are now conventional practice in the art. Still, pigments with high opacifying powers such as titanium dioxide continue to be used in paper coatings and fillings. The industry continues to search for less expensive pigments to achieve higher opacity at lower cost.

U.S. Pat. No. 3,726,700 discloses the formation of a composite pigment by adhering titanium dioxide particles to calcined clay. The titanium dioxide particles are adhered to the calcined clay by means of hydrous oxides of aluminum, silicon, and titanium. The hydrous oxides are precipitated from a slurry which also contains the calcined clay and titanium dioxide. The above composite pigment is dispersed and then blended with latex binders and thickeners. One problem is that in this process, both the calcined clay and titanium dioxide are capable of participating in homoflocculation (aggregation of multiple particles of either the clay or titanium dioxide, e.g., clay-to-clay or titanium dioxide-to-titanium dioxide) in addition to the desired heteroflocculation. The homoflocculation of titanium dioxide in particular can lead to a drop in light scattering efficiency.

U.S. Pat. No. 4,117,191 discloses a composite silicate pigment prepared by precipitating hydrous alkali metal silicate particles with alkaline earth metal ions onto the planar surfaces of dispersed clay particles. It is indicated in the patent that this results in an improvement in optical efficiency. A disadvantage of the process of this patent is that it provides limited flexibility in terms of the types of materials which can be included within the composite pigment.

U.S. Pat. No. 4,331,706 discloses a composite pigment comprising hydrous zinc oxide deposited on the surface of a core particle, followed by calcination. Cocalcination of comminuted materials such as kaolins in the presence of inorganic binders is also disclosed in U.S. Pat. Nos. 3,853,457; 3,864,140; and 3,856,545. All of these processes require the expensive calcination step as the means to formation of the composite pigment.

U.S. Pat. No. 4,820,554 discloses an aggregated pigment containing kaolin and up to 12% calcium carbonate or hydroxide. The aggregated pigment is prepared by chemically reacting dry particulate kaolin with a metal chloride such as silicon tetrachloride (SICl4). The metal chloride undergoes a hydrolytic and polymerization reaction which results in aggregation of the kaolin particles. This process has the disadvantage that it requires the use of a silicon tetrachloride which is toxic and, produces hydrogen chloride as a by-product, which must be neutralized. The process also requires an aging time for full development of optical properties.

U.S. Pat. No. 3,453,131 discloses the preparation of composite pigments from fully dispersed anionic pigments by the use of fatty acid coupling agents.

South African Applications Nos. 905093 and 905091 disclose a process for making structured aggregate pigments in which two or more non-identical pigments are joined by a silico-aluminate gel as a de-stabilizing and bonding agent. This process also suffers from the probability of homoflocculation of ingredient pigments, and uses fully dispersed pigments.

U.S. Pat. No. 2,176,877 discloses a process for the manufacture of a composite pigment. A primary pigment is dispersed in an aqueous suspension using a first dispersing agent. Separately, a secondary pigment is dispersed in an aqueous suspension using a second dispersing agent. This second dispersing agent is antipathetic to the first dispersing agent. By antipathetic, it is meant that the second dispersing agent is capable of furnishing ions, on admixture of the primary pigment and secondary pigment, which neutralize the dispersing ions of the first dispersing agent. The dispersing agents are all salts, such as aluminum chloride and sodium silicate. One example given is a coflocculation obtained by admixing a suspension of titanium dioxide, prepared by means of the acidic salt, aluminum chloride, with a suspension of barium sulfate prepared, with the basic substance, sodium silicate. Examples of other acidic dispersants given in the patent are hydrogen sulfide and lead chloride. Following coflocculation, the integrated pigment is then separated from the supernatant liquor, washed, dried, and pulverized. Dispersed pigments are used in the process of coflocculation.

SUMMARY OF THE INVENTION

An object of this invention is to provide a unique method of combining a flocculated inorganic pigment with a functional modifier in such a way as to locate such modifier on the surface of particles of the inorganic pigment in a substantially irreversible manner. Of particular value are functional modifiers selected from the group consisting of binders, organic pigments, optical brighteners, fluorocarbons, and combinations thereof. The binders can be water or alkali soluble, water dispersible, organic, or inorganic. The flocculated inorganic pigment in this invention is kaolin clay, calcium carbonate, or combinations thereof.

Another object is to produce a coating which, upon application to a paper substrate, drying, and calendering, provides improved coverage, opacity, coating pick strength and gloss.

The objects of this invention are accomplished by attachment of a functional modifier such as a binder, an organic pigment, an optical brightener, or a fluorocarbon, to flocculated clay or calcium carbonate by electrostatic attraction. This markedly differs from the traditional practice of adding coating ingredients such as binders and organic pigments to inorganic pigment particles after the inorganic pigment particles have been dispersed, or at other steps of the pigment manufacturing process. Advantage in the present invention is taken of the fact that flocculated kaolin clay and calcium carbonate have, in their non-dispersed form, a high affinity for anionic polymeric dispersants, such as sodium polyacrylate. It was discovered that, instead of satisfying this demand in the traditional way by adding such a dispersant to the flocculated kaolin clay or calcium carbonate, the material species, such as binders, organic pigments, optical brighteners, and fluorocarbons can be added. These material species carry a charge, usually anionic, and opposite to that of the flocculated kaolin clay or calcium carbonate. This allows such material species to become electrostatically bound to the residual positively charged sites on the flocculated pigment.

A traditional adjuvant dispersant such as sodium polyacrylate can be added after the functional modifier has been added to the flocculated inorganic pigment.

In a preferred embodiment of the present invention, the flocculated inorganic pigment is a filter cake of the pigment. More preferably, the flocculated inorganic pigment is a suspension of the filter cake in water to which a base such as sodium carbonate has been added to provide the filter cake with an approximately neutral pH. This neutralization partially disperses the filter cake, and at the same time leaves sufficient cationic sites on the filter cake for the absorption of a functional amount of the modifier.

The present invention also resides in a method for preparing a functionally modified kaolin clay or calcium carbonate pigment. A flocculent of the kaolin clay or calcium carbonate pigment, or mixture thereof, is provided. The flocculent is mixed with a functional modifier having charges of opposite sign to residual charge sites on the kaolin clay or calcium carbonate particles. This allows the functional modifier to become electrostatically bound to the kaolin clay or calcium carbonate particles.

In this manner materials not normally capable of adsorbing on the surface of inorganic pigment particles, when added to traditionally dispersed inorganic particles, may now be adsorbed on the surface of the pigment particles. The products thus formed may be used as is, further treated with a dispersant or filtered, washed, dried, and pulverized. Alternatively, the dried modified flocculated inorganic pigment or even a standard dispersed inorganic pigment may be back-added to the functionally modified inorganic pigment of the present invention to increase the solids content of the dispersion thereof. Pigments thus obtained may be used to replace all or part of traditional pigments in paper coating and filling applications.

The invention and objects and advantages thereof will be evident from the following description.

DESCRIPTION OF PREFERRED EMBODIMENTS

A preferred inorganic flocculated pigment, in the practice of the present invention, is flocculated kaolin clay. It will also be understood by those skilled in the art that the principles of the present invention are applicable to a flocculated, e.g., precipitated, calcium carbonate, and mixtures of kaolin clay and calcium carbonate. In the present invention, the term kaolin clay includes china clay.

The kaolin clay in the present invention has undergone one or more of the traditional steps of primary dispersing, fractionation, and then flocculation. The flocculation can be followed by bleaching and then filtration to produce a filter cake of about 60% solids. The flocculation is usually carried out using alum, sulfuric acid, a cationic polyelectrolyte, or combinations thereof. This provides cationic edge sites on the filter cake. In its filter cake form, the kaolin clay exists substantially in what is known as a house of cards structure consisting of edge to face aggregates. The cationic edge sites are considered to be bonded to the anionic basal plane of platy kaolin clay.

In the case of calcium carbonate, for instance precipitated calcium carbonate, the particles of calcium carbonate will have cationic charge sites by virtue of calcium ions adsorbed onto the surface of the particles. A filter cake can also be formed from the precipitated calcium carbonate.

Following filtration, the filter cake, e.g., clay, is preferably neutralized by mixing the filter cake with a base such as sodium carbonate (soda ash). The filter cake is preferably added to an aqueous solution of the base with good mixing. The sodium carbonate may also be added to the cake and mixed. The amount of base in the mixture depends on the acidity of the filter cake. The final preferred pH is between 6 and 9, more preferably between 7 and 8. This pH adjustment of the cake drops the viscosity of the cake to a level between an immeasurably high viscosity of the cake and the condition of very low viscosity that is obtained traditionally when sodium polyacrylate dispersant is added. This produces a slurry of filter cake in water which has significant structure as determined by the percent wet void volume after centrifugation, and which retains a functional amount of cationic sites for adsorption by anionic materials.

Following pH neutralization, the reduced viscosity filter cake is then preferably reacted with a functional modifier in accordance with the present invention. The functional modifier is one that carries a charge which is opposite the charge on the filter cake. The functional modifier reacts with the kaolin clay or calcium carbonate pigment and the modifier particles or ions thus become electrostatically bound to the pigment particles.

Following reaction of the filter cake with a modifier, the filter cake may then be dispersed in the conventional manner using a polymeric anionic dispersant such as a copolymer of acrylic acid (e.g., sodium polyacrylate) having a molecular weight in the range of about 1,000–5,000 daltons. Such dispersants are described in U.S. Pat. No. 4,517,098 (Hahn et al.). The disclosure of this patent is incorporated by reference herein.

It will be understood by those skilled in the art that in the preferred form of the present invention, the flocculated inorganic pigment has net cationic charge sites, and the functional modifier carries an anionic charge. However, it is within the scope of the present invention for the flocculated inorganic pigment to have a net anionic charge and for the functional modifier to be cationically charged.

It will also be understood by those skilled in the art that the term "flocculated", for purposes of the present application, means that state of the inorganic pigment from fully flocculated to partially dispersed. Specifically, the functional modifier need not be reacted with a filter cake of the inorganic pigment. It can be reacted with the flocculated inorganic pigment prior to filtration. It can be reacted with the filter cake prior to neutralization, by forming a suspension of the filter cake. There are applications where it would be advantageous to partially disperse the filter cake with a dispersant such as sodium polyacrylate, prior to reaction with the modifier.

In the latter instance, the amount of dispersant, if added prior to reaction with the functional modifier, should be sufficient to satisfy only part of the demand of the cationic sites on the flocculated inorganic pigment. Sufficient cationic sites should remain on the flocculated inorganic pigment for adsorption of a functional amount of the functional modifier. By "functional amount", it is meant that the amount of functional modifier electrostatically bound to the inorganic pigment is that amount necessary to produce a detectable functional change in an end use application of the pigment.

Preferably, the amount of unsatisfied charge sites on the flocculated inorganic pigment should be at least 10% of the amount of charge sites that would exist following pH neutralization of the flocculated inorganic pigment (to a pH of 6–9) with a base such as sodium carbonate. More preferably, the percent charge sites should be at least about 30%. In some applications, the percent charge sites should be more than 70% with the optimum being more than 95%.

In a first embodiment of the present invention, the modified pigment filter cake of the present invention comprises the reaction product of the slurried filter cake and a polymeric binder having a net negative charge. The filter cake may be partially neutralized and dispersed. The binder can be a water insoluble (dispersible) binder, a water or alkali soluble organic binder, or a water soluble inorganic polymeric binder. Useful water or alkali soluble binders are starch, casein, soya protein and polyvinyl alcohol. Useful water dispersible binders are lattices such as carboxylated copolymers of styrene and butadiene, carboxylated styrene acrylate copolymers, and polyvinyl acetate polymers and co-polymers. Useful water soluble inorganic polymeric binders are the polysilicates such as sodium polysilicate. It is therefore understood that any polymer having the critical physical characteristics described herein serves suitably as the binder portion of the modified pigment filter cake for the purposes of the present invention.

Preferred binders are film forming. By film forming it is meant that the binder will form a film at ambient temperature or at temperatures and pressures selected to dry or finish the substrate containing said binder when used traditionally in a coating or filling application in paper. While such temperature requirement varies with the conditions of coating and paper filling, it is preferred that the binder be filmforming below 140° F.

It is also required that the binder have a net charge effective to electrostatically bond onto the flocculated inorganic pigment particles when added to the pigment slurry. It will be understood by those skilled in the art that the term electrostatically bound, for purposes of the present application, includes hydrogen bonding. Both the location and the concentration of charge on the polymeric binder determine the total availability of charge with respect to the pigment being used.

In the case of a latex binder, the surface concentration, and not the bulk concentration, of negative charge determines the affinity to the inorganic pigment. The location of negative charge on a latex particle suspended in water may assume two extremes and many positions between these two extremes. The first extreme is the case where a latex particle has long anionic polymeric chains extending into the aqueous phase. An example of such a latex is a carboxylated styrene-butadiene latex in which the long anionic chains are composed of the sodium salt of an ethylenically unsaturated carboxylic acid such as acrylic acid, methacrylic acid, and polyacrylic acid. These lattices may be termed head and tail lattices. Preferably, these acrylate chains extend between 0.01 to 5 microns from the surface of the latex particle into the medium. Most preferably, the chain length of the acrylic tails extends between 0.05 to 0.5 microns into the medium.

The second extreme in location of surface anionic charge on a latex particle is described by the concept of a hairy latex. A hairy latex consists of many short polymeric anionic chains extending into the aqueous phase. An example of such a latex is a carboxylated styrenebutadiene latex in which the chains extend from 0.005 to 0.5 microns and most preferably between 0.01 microns and 0.1 microns.

The latex binders of the present invention are further characterized with respect to carboxylation as low, medium, or highly carboxylated. Respectively, the degrees of carboxylation, which is an indicator of anionic charge, are 7%–10%, 4%–6%, and 2%–5%. Preferably, low to medium carboxylated lattices are used in the present invention to make a latex modified inorganic pigment.

It is also recognized that, since surface adsorption of lattices is charge based, the lattices of the present invention may be surface modified to possess sulfonate or phosphonate moieties, such as a vinyl sulfonic acid moiety, or a vinyl phosphonic acid moiety, in place of an ethylenically unsaturated carboxylic acid moiety, in order to create the electrostatic bond between the latex particle and the flocculated inorganic pigment.

The particle size of binder lattices useful in the present invention are preferably between 0.01 and 2 microns and most preferably between 0.1 and 0.3 microns in diameter. It is recognized that the compositions of lattices that may fall within the previous limits is great in number.

Suitable latex binders useful to prepare composite particles of the present invention, in addition to styrenebutadiene lattices are acrylic resin emulsions, especially such aqueous dispersions of polymers which include a small amount of copolymerized ethylenically unsaturated carboxylic acid; the lattices of butadiene and acrylonitrile, vinyl acetate and the acrylates, butadiene and methyl methacrylate, vinyl chloride and vinylidene chloride; and homopolymers of butadiene, methyl methacrylate, vinyl acetate, chloroprene, vinyl chloride, and butyl methacrylate.

Modified flocculated pigments formed by adsorption of latex binders such as described above are characterized herein as prebound pigments in that the dispersed flocculated pigment contains a measure of adsorbed latex binder particles. Preferably the percent of latex particles adsorbed on the flocculated pigment particle prior to or during the dispersion step is between 0.1 and 25% by weight based on the weight of pigment. More preferably, the percentage is between 1.0 and 10% by weight. Most preferably, the percentage is between 1% and 5% by weight.

With respect to water or alkali soluble organic polymeric binders or inorganic polymeric binders, it is required that these binders have a sufficient anionic or negative charge density or have sufficiently strong hydrogen bonding potential to have affinity to the slurried pigment. The anionic charge density is characterized as the net negative charge per kilogram of polymer and is expressed as the number of moles of anionic moiety per kilogram of polymer (anionic charge density). Typical moieties that provide the needed affinity are $-CO_2{}^-$, $-SO_3{}^-$, and $-PO_3{}^-$. Preferably, the anionic charge density is between 0.1 and 15 and, more preferably, between 0.5 and 5. To function as a binder, it is also required that these polymers have sufficient molecular weight. Preferably, the average molecular weight is between 20,000 and 2,000,000 daltons. More preferably, the molecular weight is between 100,000 and 500,000 daltons.

Typical water or alkali soluble binders useful in the present invention are oxidized starch, styrene maleic anhydride copolymers, soya proteins and carboxylated soya proteins, casein, copolymers of water insoluble vinyl unsaturated monomers and water soluble vinyl unsaturated acids, such as an 80% ethylene 20% acrylic acid copolymer.

A typical adsorbing hydrogen bonding water soluble binder is polyvinyl alcohol.

Typical inorganic polymeric binders are polysilicate binders such as sodium polysilicate and colloidal silica binders such as "Snowtex ST40" and "ST-50", marketed by Nissan Chemical Industries.

Several factors affect the binding power of a given binder. The distribution of binder particles may not be uniform with respect to pigment due to homoflocculation of the binder. This causes reduced strength. As a result of irregularities in the substrate surface, varying coating weight, and varying drying conditions, binder migration may take place to the surface or to the substrate resulting in non-uniformity. Additionally, as a function of irregularities in the consolidation process of the coating, pooling of binder may take place in locations across the cross-sectional thickness of a coating. These phenomena all lead to low coating strength or require increased usage of binder which not only is expensive but also reduces the optical performance of a coating. The present invention overcomes these disadvantages.

Another fundamental reason for binder performance or the lack of it is the relative chemical affinity of the binder to pigment and the permanence of this bond. Clay and dispersed calcium carbonate dispersed with sodium polyacrylate have a high negative zeta potential. In view of the anionic nature of most binders, it is not surprising that some repulsion between pigment and binder take place in the consolidation of the coating. In addition, the chemical similarity in charge of the ionic surface of dispersed pigments and that of binders such as latex might not be expected to lead to optimum cohesion of pigment for printing. The present invention overcomes these disadvantages.

In a second embodiment of the present invention, the modified flocculated inorganic pigment products comprise combinations of flocculated inorganic pigment and anionically charged organic particles. Examples of organic particles are plastic pigment particles, and organic natural particles which are insoluble or not fully solubilized such as starch, casein and soya protein. The organic particles are defined as being at least 50% composed of carbon, hydrogen and oxygen. They are further defined as being insoluble in water. The organic particle is required to have a microscopically recognizable shape while suspended in water. Preferably, the organic particles have an average particle dimension between 0.01 and 5 microns and, more preferably, between 0.1 and 1.0 micron.

An example of a suitable plastic pigment particle is a solid plastic particle as disclosed in U.S. Pat. No. 3,949,138. The particle is anionic due to the use of an unsaturated carboxylic acid monomer as a polymer component. The particle can also be a hollow sphere, a blushed polystyrene sphere, a hollow organic sphere having pigment embedded in the surface of the sphere, or a polymeric pigment containing a protein and a monomer which is polymerized.

Such particles offer improvement in light scatter by either providing pigment internal voids of about 0.25 microns, or by imparting an increased number of voids to the balance of the materials present in the coating. It is recognized that the organic particle may exist as a swollen particle.

The modified pigment of the present invention is formed preferably by addition of a suspension of organic particles to a partially neutralized or alkaline slurry of the flocculated inorganic pigment. Alternatively, the slurried flocculated inorganic pigment may be added to a suspension of organic particles. To achieve affinity to the flocculated inorganic pigment, the organic particles must have sufficient negative charge density when used with a flocculated pigment having available cationic charge sites. The surface charge density is best expressed in terms of zeta potential. Preferably, the zeta potential is between $-3$ and $-70$ millivolts and more preferably between $-10$ and $-50$ millivolts. It is further required that the organic particle adsorbed on the flocculated inorganic pigment not form a film during processing or end use. For example, the modified pigment should be substantially stable in its geometry when applied in a paper coating and dried. This requires the absence of film formation, of the organic particles, up to 100° C.

By bonding the organic particles to the clay or calcium carbonate filter cake, minimum migration of the organic particles occurs. This provides a more uniform distribution of the organic particles and optimum light scatter. By reducing migration into the substrate, enhanced gloss on calendering is obtained. Further, the organic particles are subject to homoflocculation, and this problem is prevented.

A third embodiment of the present invention is addition of optical brighteners to the flocculated inorganic pigments. U.S. Pat. Nos. 4,954,566, 5,039,782 and 4,963,625 disclose water soluble polymeric optical brighteners having an acrylic acid moiety, useful in the present invention. The disclosures of these patents are incorporated herein by reference.

A fourth embodiment of the present invention is using an anionic water soluble or dispersible anionic polymeric fluorocarbon as the functional modifier. Such fluorocarbons can be added to the flocculated pigments and when bonded to the surface of the pigment particles, impart oil or water resistance (hydrophobicity) to the flocculated pigment particles and paper base or coating compositions containing the particles. Suitable water soluble fluorocarbons include FC-807 and FC-809 marketed by 3M. Suitable fluorocarbon polymers are Zonyl NWA and TL5840 marketed by E.I. DuPont de Nemours & Co.

It will be understood by those skilled in the art that mixtures of binders, organic particles, optical brighteners, and fluorocarbons may be used to prepare the modified flocculated inorganic pigments of the present invention.

The following examples illustrate the invention but are not to be construed as limiting its scope. All percentages are by weight.

EXAMPLE 1

The purpose of this Example is to illustrate the preparation of a functionally modified pigment from a pigment filter cake. The pigment filter cake was kaolin clay. The kaolin clay was modified by adsorption of a latex binder onto the filter cake.

The filter cake was a #1 kaolin clay obtained from Dry Branch Kaolin Company. The filter cake had been manufactured by the traditional steps of fractionation, bleaching, flocculation with sulfuric acid, alum, or a cationic polymer, and filtration. The filter cake had a solids content of 60% by weight. The viscosity of the filter cake was reduced by adding 38.4 grams of 9% sodium carbonate in water to 2,400 grams of the filter cake. The filter cake after addition was mixed at 7,000 rpm using a Premier mixer for 15 minutes. This produced a partially dispersed essentially neutral filter cake having a Brookfield viscosity of 1,288 mps at 10 rpm. The partially dispersed filter cake had a pH of 7.7

The filter cake was divided into eight (8) 300 gram samples. The samples are labelled Experiments 1-8 in the following Table 1.

A Dow 620 latex binder was added to samples 3-8, in varying amounts, ranging from two weight percent to eight weight percent, based on the weight of the filter cake. The specific amounts are indicated in Table 1. The Dow 620 latex was a 50% solids dispersion of styrene-butadiene binder.

Samples 2, 7 and 8 in Table 1 were control samples involving the addition of 0.08 weight percent sodium polyacrylate dispersant (Colloids 211). This is the amount of dispersant conventionally added to a kaolin clay filter cake to disperse the filter cake. In sample 2, the dispersant was added to the neutralized cake, to which no Dow 620 latex had been added. In sample 7, the dispersant was added to the neutralized cake prior to Dow 620 latex addition. In sample 8, the dispersant was added to the neutralized cake following Dow 620 latex addition.

The viscosity of each sample was measured. A portion of each sample was also centrifuged at 5,000 rpm for 30 minutes. The clarity of the supernate was noted and the percent latex adsorbed on the slurry clay filter cake was also measured by drying the supernate and conducting a mass balance. The precipitate resulting from centrifugation was dried and weighed enabling calculation of the void volume of the modified filter cake.

The results are given in Table 1.

Sample 1 was filter cake which was neutralized with sodium carbonate. This sample had a viscosity of 1,288 mps.

Sample 2 was neutralized filter cake to which sodium polyacrylate dispersant was added. This reduced the viscosity of the filter cake to 81 mps, and demonstrates, by comparison to Sample 1, the partially flocculated nature of the filter cake in Sample 1, and reduced viscosity from only the addition of the sodium carbonate.

In samples 3-5, with 2-4% addition of Dow 620 latex binder, the mass balance indicated 100% absorption of the binder on the clay particles. The supernate was clear confirming the absence of desorption by centrifugation and strong bonding of the binder to the filter cake. In sample 5, with 4% addition, the viscosity of the sample dropped as well as the percent wet void volume. This indicated that the filter cake varied in bulkiness depending upon the level of latex added. In sample 6, with 8% addition of Dow 620 latex, the supernate was milky and the absorption was only 63%. This indicated that more binder was added than needed to satisfy the cationic charge sites of the filter cake. In a coating composition, the excess binder could migrate, for instance into the substrate to provide interfacial bonding between the coating and the substrate. In some instances, this would be desirable. The scope of the present invention thus includes the addition of excess binder.

By comparing samples 3 and 7, it is seen that the addition of the sodium polyacrylate dispersing agent to the cake slurry before latex addition resulted in no adsorption of latex by the filter cake. The supernate from centrifugation was milky.

By comparing samples 3 and 8, in which the sodium polyacrylate dispersing agent was added after latex addition, it is seen that the addition of adjuvant dispersant caused minimal desorption yet resulted in a significant viscosity decrease. This was a surprising aspect of the present invention, that addition of the sodium polyacrylate dispersing agent after latex addition failed to displace the latex.

The above data also demonstrates that some sodium polyacrylate dispersing agent could be added prior to addition of the binder, as long as sufficient cationic sites remained for reaction with a functional amount of binder.

TABLE 1

| Experiment | Cake Sample | % Dow 620 Added Based on Cake | Dow 620 % Adsorbed | % Solids of Modified Cake Slurry | Brookfield Viscosity MPS | % Wet Void Volume | Supernate Clarity |
| --- | --- | --- | --- | --- | --- | --- | --- |
| 1 | Cake + Na2CO3 | 0 | 0 | 59.0 | 1288 | 45.3 | Clear |
| 2 | Cake + Na2CO3 + 0.08 C-211 | 0 | 0 | 59.0 | 81 | 46.1 | Clear |
| 3 | Cake + Na2CO3 | 2 | 100 | 58.8 | 940 | 44.8 | Clear |
| 4 | Cake + Na2CO3 | 3 | 100 | 58.7 | 1660 | 48.2 | Clear |
| 5 | Cake + Na2CO3 | 4 | 100 | 58.6 | 800 | 47.0 | Clear |
| 6 | Cake + Na2CO3 | 8 | 63.0 | 58.4 | 220 | 45.7 | Milky |
| 7 | Cake + Na2CO3 + .08 C-211 | 2 | 0 | 58.8 | 80 | 44.5 | Milky |
| 8 | Cake + Na2CO3 + .08 C-211 after latex | 2 | 93.2 | 58.8 | 200 | 46.0 | Slightly Milky |

EXAMPLE 2

The purpose of this Example is to illustrate that the latex modified clay filter cake may be prepared with a variety of conventional lattices. Latex modified clay filter cake was prepared as in Example 1. The results are shown in Table 2. The best adsorption was obtained with medium carboxylated lattices.

TABLE 2

| Latex | Latex Carboxylation | Latex particle Size Microns | % Latex added based on cake | % Latex Adsorbed | Brookfield Viscosity MPS | % Wet Void Volume |
| --- | --- | --- | --- | --- | --- | --- |
| Dow 620 | 5-6 | 0.18 | 2 | 100 | 940 | 44.8 |
| Dow 615 | 2-3 | 0.10 | 3.0 | 37 | 200 | 47.1 |
| Dow 640 | 2-3 | 0.14 | 3.0 | 70.7 | 340 | 47.4 |

TABLE 2-continued

| Latex | Latex Carboxylation | Latex particle Size Microns | % Latex added based on cake | % Latex Adsorbed | Brookfield Viscosity MPS | % Wet Void Volume |
|---|---|---|---|---|---|---|
| Dow 692 | 5-6 | 0.13 | 2.0 | 100 | 320 | 48.1 |

EXAMPLE 3

The purpose of this example is to illustrate that modified clay filter cake pigments may be prepared using anionic solution binders. A slurry of #1 kaolin clay filter cake at pH 7.7 was prepared as in Example 1. To 300 grams of this slurry, 30.8 gms of 35% ammonia hydroxide solubilized 80/20 ethylene acrylic acid copolymer (50T4990 from Morton Thiokol) was added and mixed. Of the six dry parts of copolymer based on dry clay, it was found that 25% had adsorbed providing a suspension having a viscosity of 820 mps at 58.4% solids and a wet void volume of 49.2%.

EXAMPLE 4

The purpose of this Example is to illustrate that modified clay filter cake pigments may be prepared using organic particles. Slurry #1 filter cake was prepared at pH 7.7 as in Example 1. To 300g of this slurry, 22.5 grams of a 48% solids suspension of polystyrene spheres ("Lytron 2503", Morton Thiokol) having a particle size of 0.47 microns was added with mixing. It was determined that 55% of the 6 parts based on dry filter cake had been adsorbed resulting in a viscosity of 180 mps at 58.4% solids. The wet void volume was 47.8%

EXAMPLE 5

The purpose of this Example is to illustrate that a modified clay filter cake pigment may be prepared using a hydrogen bonding solution polymer. To 200 grams of the filter cake slurry of Example 1, polyvinyl alcohol was added from a 9% solution. Two molecular weight distributions were examined—"Airvol 103", 13–23,000 daltons and "Airvol 325", 85–146,000 daltons, from Air Products Corporation. Results are shown in Table 3. It is seen that adsorption of low molecular weight polyvinyl alcohol produces no significant structuring effect while the higher molecular weight polyvinyl alcohol produces a modified filter cake with increased wet void volume.

TABLE 3

| Polyvinyl Alcohol | % Polyvinyl Alcohol Added | % Solids of Modified Cake Slurry | % Polyvinyl Alcohol Adsorbed | Brookfield Viscosity | % Wet Void Volume |
|---|---|---|---|---|---|
| None | 0 | 56.2 | — | 344 | 48.4 |
| Airvol 103 | 1.0 | 56.2 | 100 | 880 | 48.1 |
| None | 0 | 53.7 | — | 100 | 48.0 |
| Airvol 103 | 2.0 | 53.7 | 73 | 1340 | 48.6 |
| Airvol 325 | 1.0 | 56.2 | 100 | 8200 | 53.4 |

EXAMPLE 6

The purpose of this Example is to illustrate that the filter cake may be composed of clay particles of a larger size than used in Example 1.

To 2371 grams of 62.4% solids HT filter cake, a #2 clay cake obtained from Englehard Corporation, was added 35.6 grams of 9% sodium carbonate in water. The resultant slurry at a pH 7.3 was mixed at 8,000 rpm for 30 minutes. Varying amounts of Dow 620 latex were added to prepare latex modified filter cake. The results are summarized in Table 4.

In experiments 3, 4, and 5 it is seen that up to 7.7% latex added, almost 100% was adsorbed on the surface of the cake slurry. As the level of latex added was increased the viscosity decreased until at 7.7% latex it was lower than the original cake slurry.

The decrease in viscosity was accompanied by a decrease in wet void volume which demonstrated that the adsorbed latex exerted a dispersion effect relative to the original cake (Experiment 1).

Experiment 6 represented the traditional procedure for dispersing a cake slurry in which 0.08% Colloids 211 sodium polyacrylate dispersant was added. Subsequently, Dow 620 was added. By comparison to experiment 3 it is seen that the fully dispersed cake was not capable of exhibiting adsorption of the latex binder. By comparing experiment 7, in which dispersant was added after the latex modified cake was made, to experiment 3, it is seen that the dispersant was not capable of removing Dow 620 from the latex modified filter cake even though it exerted a powerful effect in reducing viscosity and wet void volume.

TABLE 4

| Experiment | Cake Sample | % Dow 620 Added Based on Cake | Dow 620 % Adsorbed | % Solids of Modified Cake Slurry | Brookfield Viscosity | % Wet Void Volume | Supernate Clarity |
|---|---|---|---|---|---|---|---|
| 1 | Cake + Na2CO3 | 0 | 0 | 62.4 | 8,600 | 47.7 | Clear |
| 2 | Cake + Na2CO3 + 0.08 C-211 | 0 | 0 | 62.4 | 80 | 45.7 | Clear |
| 3 | Cake + Na2CO3 | 3.8 | 100 | 61.8 | 31,480 | 47.7 | Clear |
| 4 | Cake + Na2CO3 | 5.8 | 100 | 61.6 | 11,400 | 45.2 | Clear |
| 5 | Cake + Na2CO3 | 7.7 | 96.6 | 61.3 | 3,300 | 43.8 | Slightly Milky |
| 6 | Cake + Na2CO3 + .08% C-211 | 3.8 | 0 | 61.8 | 88 | 44.7 | Very Milky |
| 7 | Cake + Na2CO3 + post add | 3.8 | 100 | 61.6 | 332 | 43.2 | Clear |

TABLE 4-continued

| Experiment | Cake Sample | % Dow 620 Added Based on Cake | Dow 620 % Adsorbed | % Solids of Modified Cake Slurry | Brookfield Viscosity | % Wet Void Volume | Supernate Clarity |
| --- | --- | --- | --- | --- | --- | --- | --- |
|  | .08 C-211 |  |  |  |  |  |  |

EXAMPLE 7

The purpose of this Example is to illustrate the preparation of optical brightener modified clay filter cake. To 300 grams of slurry filter cake from Example 7 were added varying amounts of "Tinopal SCP" (Trademark, Ciba-Geigy Corp.), a hexasulfonated sodium salt optical brightener. The adsorption of this anionic optical brightener on the clay filter cake slurry was monitored by observing the changes in viscosity. Results are summarized in Table 5. A reduction in viscosity is correlated with adsorption. It is seen that between 0.16 and 0.32% "Tinopal SCP" was adsorbed.

TABLE 5

| % Dry Tinopal SCP Added Based on Cake | Brookfield Viscosity 10 rpm |
| --- | --- |
| 0 | 19,000 |
| 0.08 | 11,140 |
| 0.16 | 9,740 |
| 0.32 | 11,120 |

EXAMPLE 8

The purpose of this Example is to illustrate the benefits of using a latex modified filter cake as the pigment in a rotogravure paper coating formulation in which only synthetic binders are used. A typical commercial all synthetic rotogravure formulation consists of 50% delaminated clay ("Nuclay" from Englehard Corporation), 50% #2 clay (HT from Englehard Corporation), and 5% RAP177 (a clay reactive rotogravure latex from Dow Chemical Corporation) based on total clay. This formulation was compared to the instant invention in which the pigment consisted of 50% Dow 620 latex modified filter cake made as described in Example 1 and consisted of #1 clay filter cake slurry obtained from Dry Branch Kaolin Company and 4% Dow 620 latex. The remaining 50% of the pigment consisted of Dow 620 latex modified filter cake made as in Example 7 and consisted of #2 clay filter cake slurry obtained from Englehard Corporation and 6% Dow 620 latex. It is noted that both formulas contained a total of 5% latex based on pigment. A third coating containing 50% dispersed #1 clay, 50% dispersed #2 clay and 5% Dow 620 latex based on clay was also examined. It is noted that this coating contained exactly the same ingredients as the second coating except for the fact that the latex was not prebound, and fully dispersed clay filter cake instead of slurried filter cake was used. This third coating was not runnable due to its low viscosity. Coatings were prepared by simple mixing of ingredients. Rheological characterization is summarized in Table 6. From the percent wet void volume, it is seen that coatings 1 and 2 may be considered structured relative to coating 3.

The coatings 1-3 were blade coated on a Time-Life coater on a 52 gsm rawstock, dried, conditioned at 50% RH, supercalendered 2 nips at 178° F., and tested. The results are summarized in Table 7. It is seen that, at equal coat weight, the latex modified filter cake of the present invention offered significantly improved gloss, opacity, and coating IGT pick strength over both the commercial control and the totally dispersed system.

TABLE 6

| Coating # | % Solids | Brookfield Viscosity MPS | | Hercules* Viscosity dyne-cm | % Wet Void Volume |
| --- | --- | --- | --- | --- | --- |
|  |  | 10 rpm | 100 rpm |  |  |
| 1 | 59.0 | 10,400 | 1,228 |  | 49 |
| 2 | 59.2 | 400 | 198 | 2.8 | 46.5 |
| 3 | 58.1 | 88 | 24 | 1.3 | 41.0 |

*E bob 4,400 rpm 400,000 dyne spring

TABLE 7

| Coating # | Formulation | Coatweight gsm | Gloss | Opacity | IGT Pick Velocity Viscosity Product - cm |
| --- | --- | --- | --- | --- | --- |
| 1 | Nuclay, HT, RAP177 | 9.6 | 63.3 ± 1.0 | 78.5 ± 0.2 | 1.2 |
| 2 | Latex Modified Filter Cake | 9.4 | 66.4 ± 0.5 | 79.2 ± 0.4 | 6.5 |
| 3 | #1 Clay, HT, Dow 620 | 9.3 | 62.7 ± 0.7 | 78.2 ± 0.5 | 5.5 |

EXAMPLE 9

The purpose of this Example is to illustrate the benefits obtained using latex modified clay filter cake in a rotogravure formulation which conventionally employs both a latex and a natural binder, i.e., starch. Coatings were prepared as in Example 8 except that an additional 4% Penford Gum 280 starch, based on pigment, was added to each coating. Coatings were applied and coated paper processed as in Example 9. Rheological and physical test data are summarized in Table 8.

At equal coatweight a significant improvement in both gloss and opacity is observed with the latex modified filter cake coating compared to the two control formulations. The IGT pick strength with the structured latex modified clay filter cake system is equivalent to the control coating No. 1 and improved over the control coating No. 3.

TABLE 8

| Coating # | Formulation | % Solids | Brookfield Viscosity 10 rpm | Brookfield Viscosity 100 rpm | Hercules* Viscosity Dyne-cm | Coat-weight gsm | Gloss | Opacity | IGT Pick Viscosity Velocity Product |
|---|---|---|---|---|---|---|---|---|---|
| 1 | 50% Nuclay + 50% #2 clay + 5% Dow 620 latex + 4% starch | 57.0 | 760 | 190 | 2.5 | 7.4 | 54.2 ± 0.4 | 76.4 ± 0.4 | 20.3 |
| 2 | 50% latex modified #1 filter cake — 4% Dow 620 + 50% latex modified #2 filter cake — 6% Dow 620 + 4% starch | 56.4 | 3,700 | 620 | 3.7 | 7.7 | 63.4 ± 1.5 | 78.3 ± 0.1 | 18.6 |
| 3 | 50% #1 clay + 50% #2 clay + 5% Dow 620 + 4% starch | 56.7 | 1,340 | 284 | 3.0 | 7.3 | 54.1 ± 1.1 | 77.4 ± 0.2 | 13.7 |

*E Bob 4,400 rpm 400,000 dyne spring

From the above description of the invention, those skilled in the art will perceive improvements, changes and modifications. Such improvements, changes and modifications within the skill of the art are intended to be covered by the appended claims.

Having described the invention, the following is claimed:

1. A modified pigment resistant to modifier migration comprising:
    (a) particles of a flocculated kaolin clay comprising available cationic charge sites;
    (b) a functional modifier comprising available anionic charge sites electrostatically bound to said kaolin clay particles, said modifier being selected from the group consisting of:
       1) a water insoluble or dispersible latex binder;
       2) a water or alkali soluble organic or inorganic binder;
       3) a non-film forming organic particle;
       4) a plastic pigment;
       5) an optical brightener, and
       6) combinations thereof;
    the amount of functional modifier electrostatically bound to the flocculated clay particles being an effective amount to produce a detectable functional change in an end use application of the clay.

2. The pigment of claim 1 wherein said flocculated clay is a filter cake.

3. The pigment of claim 2 wherein said flocculated clay is a filter cake which is neutralized with a base to a pH of 6 to 9.

4. The pigment of claim 3 wherein said neutralized filter cake has available cationic sites equal to at least 10% of the sites remaining, following neutralization, for reaction with the functional modifier.

5. The pigment of claim 4 wherein said flocculated clay is one which is partially dispersed with a polymeric anionic dispersant.

6. The pigment of claim 5 wherein said dispersant is a neutralized polymer of acrylic acid having a molecular weight in the range of 1,000 to 5,000 daltons and is added to the clay prior to, simultaneous with, or following reaction of the flocculated clay with functional modifier.

7. The pigment of claim 1 wherein said functional modifier is a water insoluble latex binder having a degree of carboxylation, sulfonation or phosphonation up to about 10%.

8. The pigment of claim 7 wherein said latex binder has a particle diameter of about 0.01 to 2 microns.

9. The pigment of claim 7 comprising flocculated clay having absorbed up to about 25% by weight binder based on the weight of the flocculated clay.

10. The pigment of claim 1 wherein said functional modifier is a water or alkali soluble organic or inorganic polymeric binder having an anionic charge density in the range of 0.1 to 15 moles per kilogram of polymeric binder.

11. The pigment of claim 10 wherein said binder has a molecular weight in the range of 20,000 to 2,000,000 daltons.

12. The pigment of claim 9 wherein said binder is polyvinyl alcohol.

13. The pigment of claim 1 wherein said functional modifier is an insoluble or partially solubilized organic particle having a zeta potential of −3 to −70 millivolts.

14. The pigment of claim 13 wherein said organic particle is non-film forming at temperatures up to 100° C.

15. The pigment of claim 13 wherein said organic particle has a particle size of 0.1 to 5 microns.

16. The pigment of claim 15 wherein said organic particle is a plastic pigment.

17. The pigment of claim 1 prepared by the steps comprising:
    (a) providing a water suspension of said filter cake essentially free of polymeric dispersant;
    (b) neutralizing said filter cake with a base to a reduced viscosity; and
    (c) mixing said filter cake with said functional modifier.

18. The pigment of claim 17 wherein said filter cake after neutralization has a pH in the range of 6 to 9 and is mixed with a polymeric dispersant prior to, during, or after mixing with the functional modifier.

19. The pigment of claim 17 wherein said filter cake is partially neutralized to a pH of 6 to 9 with the addition of sodium carbonate to said suspension.

20. A method for making a functionally modified pigment resistant to modifier migration comprising the steps of:
    (a) providing a non-dispersed or partially dispersed water suspension of particles of a flocculated kaolin clay comprising available cationic charge sites;
    (b) mixing said suspension with a functional modifier comprising available anionic charge sites wherein said functional modifier is electrostatically bound to said kaolin clay particles, said modifier being selected from the group consisting of:
       1) a water insoluble or dispersable latex binder, 2) a water or alkali soluble organic or inorganic binder,
3) a non-film forming organic particle,
4) a plastic pigment,
5) an optical brightener, and
6) combinations thereof;

the amount of functional modifier electrostatically bound to the flocculated clay particles being an effective amount to produce a detectable functional change in an end use application of the clay.

21. The method of claim 20 including the step of at least partially neutralizing said flocculated clay prior to the mixing of step (b) to reduce the viscosity of said suspension.

22. The method of claim 21 wherein said flocculated clay is an aqueous suspension of a filter cake and is neutralized to a pH of 6 to 9.

23. The method of claim 21 wherein said suspension is neutralized with sodium carbonate, further including the step of partially dispersing said filter cake prior to, during, or after the mixing of step (b) with a polymeric dispersant.

24. The method of claim 23 wherein said flocculated clay has available cationic sites equal to at least 10% of the sites remaining, following neutralization, for reaction with the functional modifier.

25. The method of claim 24 wherein said flocculated clay is fully dispersed with a polymeric anionic dispersant following reaction with said functional modifier.

26. The method of claim 25 wherein said dispersant is a neutralized polymer of acrylic acid having a molecular weight of 1,000 to 5,000 daltons.

27. The method of claim 20 wherein said functional modifier is a water insoluble latex binder having a degree of carboxylation, sulfonation or phosphonation up to about 10%.

28. The method of claim 27 wherein said latex binder has a particle diameter of about 0.01 to 2 microns.

29. The method of claim 27 wherein said flocculated clay has absorbed up to about 25% by weight binder based on the weight of the flocculated clay.

30. The method of claim 20 wherein said functional modifier is a water or alkali soluble organic or inorganic polymeric binder having an anionic charge density in the range of 0.1 to 15 moles per kilogram of polymeric binder.

31. The method of claim 30 wherein said binder has a molecular weight in the range of 20,000 to 2,000,000 daltons.

32. The method of claim 29 wherein said binder is polyvinyl alcohol.

33. The method of claim 20 wherein said functional modifier is an insoluble or partially solubilized organic particle having a zeta potential of $-3$ to $-70$ millivolts.

34. The method of claim 33 wherein said organic particle is non-film forming at temperatures up to 100° C.

35. The method of claim 34 wherein said organic particle has a particle size of 0.01 to 5 microns.

36. The method of claim 35 wherein said particle is a plastic pigment.

37. A modified pigment prepared by the method of claim 20.

38. A latex modified filter cake prepared by the method of claim 27.

39. A modified filter cake prepared by the method of claim 20.

40. The pigment of claim 1 in dried form.

41. The method of claim 20 further comprising the step of drying the functionally modified pigment.

42. A modified pigment resistant to modifier migration comprising:
(a) particles of a flocculated calcium carbonate comprising available cationic charge sites;
(b) a functional modifier comprising available anionic charge sites electrostatically bound to said calcium carbonate particles, Said modifier being selected from the group consisting
1) a water insoluble or dispersible latex binder;
2) a water or alkali soluble organic or inorganic binder;
3) a non-film forming organic particle;
4) a plastic pigment;
5) an optical brightener, and
6) combinations thereof;

the amount of functional modifier electrostatically bound to the flocculated calcium carbonate particles being an effective amount to produce a detectable functional change in an end use application of the calcium carbonate.

43. The pigment of claim 42 wherein said flocculated calcium carbonate is a filter cake.

44. The pigment of claim 42 wherein said flocculated calcium carbonate is one which is partially dispersed with a polymeric anionic dispersant.

* * * * *

UNITED STATES PATENT AND TRADEMARK OFFICE
CERTIFICATE OF CORRECTION

PATENT NO. : 5,449,402
DATED : September 12, 1995
INVENTOR(S) : Michael Whalen-Shaw It is certified that error appears in the above-indentified patent and that said Letters Patent is hereby corrected as shown below:

Column 20, line 31, change "Said" to --said--.

Column 20, line 32, after "consisting" insert --of:--.

Column 20, line 47, change "42" to --43--.

Signed and Sealed this

Twentieth Day of February, 1996

Attest:

BRUCE LEHMAN

Attesting Officer

Commissioner of Patents and Trademarks